United States Patent [19]

Peponides et al.

[11] Patent Number: 5,406,613
[45] Date of Patent: Apr. 11, 1995

[54] METHOD AND APPARATUS FOR REDUCING POWER CONSUMPTION IN CELLULAR TELEPHONE BY ADAPTIVELY DETERMINING THE RELIABILITY OF THE RECEPTION OF A RECEIVED MESSAGE BLOCK

[75] Inventors: George M. Peponides, Encinitas; Stacy Wile, Carlsbad, both of Calif.

[73] Assignee: Pacific Communication Sciences, Inc., San Diego, Calif.

[21] Appl. No.: 84,899

[22] Filed: Jun. 29, 1993

[51] Int. Cl.$^6$ .................... H04M 11/00; H04J 3/24; H04B 1/16
[52] U.S. Cl. .................... 379/58; 370/94.1; 455/343
[58] Field of Search .................... 455/383, 127, 343; 379/58, 59, 56; 370/94.1; 340/825.44, 825.47; 375/5

[56] References Cited

U.S. PATENT DOCUMENTS

| | | | |
|---|---|---|---|
| 3,694,755 | 9/1972 | Ward | 325/392 |
| 4,370,753 | 1/1983 | Ehmke | 455/36 |
| 4,631,496 | 12/1986 | Borras et al. | 331/1 A |
| 4,903,335 | 2/1990 | Shimizu | 455/343 |
| 4,905,234 | 2/1990 | Childress et al. | 370/94.1 |
| 4,961,073 | 10/1990 | Drapac et al. | 340/825.44 |
| 4,996,526 | 2/1991 | DeLula | 455/343 |
| 5,025,251 | 6/1991 | Mittel et al. | 340/825.44 |
| 5,027,428 | 6/1991 | Ishiguro et al. | 455/67 |
| 5,103,192 | 4/1992 | Sekine et al. | 331/1 A |
| 5,109,530 | 4/1992 | Stengel | 455/38.3 |
| 5,175,870 | 12/1992 | Mabey et al. | 455/67 |
| 5,175,874 | 12/1992 | Auchter | 455/343 |
| 5,179,724 | 1/1993 | Lindoff | 455/76 |
| 5,251,325 | 10/1993 | Davis et al. | 455/343 |
| 5,265,270 | 11/1993 | Stengel et al. | 455/343 |

FOREIGN PATENT DOCUMENTS 62-23266  1/1987  Japan

Primary Examiner—Curtis Kuntz
Assistant Examiner—William Cumming
Attorney, Agent, or Firm—Woodcock Washburn Kurtz Mackiewicz & Norris

[57] ABSTRACT

A method for reducing power consumption in a cellular telephone that receives multiple copies of a message comprises the steps of receiving a copy of a message block having a plurality of data bits; generating soft output signals representative of all data bits in the message block; computing a block quality metric indicative of the reliability of the message block; comparing the block quality metric with a first threshold; if the block quality metric bears a predetermined relation to the first threshold, combining the copy of the message block with a previously accepted message block to obtain a combined message block; determining the number of erasures in the combined message block; comparing the number of erasures with a second threshold; if the number of erasures is below the second threshold, decoding the combined message block to determine the number of errors in the combined message block; comparing the number of errors with a third threshold and, if the number of errors is below the third threshold, accepting the combined message block; and generating timing signals instructing the receiving device to interrupt reception of further copies of the message block for a specified period of time.

17 Claims, 2 Drawing Sheets

METHOD AND APPARATUS FOR REDUCING POWER CONSUMPTION IN CELLULAR TELEPHONE BY ADAPTIVELY DETERMINING THE RELIABILITY OF THE RECEPTION OF A RECEIVED MESSAGE BLOCK

FIELD OF THE INVENTION

The present invention relates generally to radiofrequency (RF) communications and receivers therefor, and more particularly, to cellular, or mobile, radiotelephones (referred to hereinbelow as cellular telephones). Still more particularly, the present invention relates to methods and apparatus for reducing standby power consumption in analog or dual mode cellular telephones employing the AMPS communications standard.

BACKGROUND OF THE INVENTION

The preferred application of the present invention is in association with an analog cellular telephone, and thus, the cellular telephone field is the technological field most pertinent to the preferred embodiments of the invention. However, the present invention may also be employed in association with a dual mode (analog/digital) cellular telephone and like receiving devices. Accordingly, except as they may be expressly so limited, the scope of protection of the claims appearing at the end of this specification is not limited to applications of the invention involving an analog cellular telephone.

FIG. 1 is a block diagram of a cellular telephone. The cellular telephone includes a radio transceiver 10, a demodulator 12, an error correction decoder 16, and a voice decoder 18, which are all coupled to the speaker portion of a handset 20. (FIG. 1 also depicts a bidirectional equalizer 14 that is not relevant to the present invention.) The system further comprises, coupled to the microphone portion of the handset 20, a voice encoder 22, error correction encoder 24 and modulator 26.

The cellular telephone operates in the environment of a cellular system. A cellular system typically includes many cell sites and a centrally-located cellular switch, called a Mobile Telephone Switching Office (MTSO). Cell sites are usually spaced at distances of one-half to twenty miles and comprise one or more antennas mounted on a triangular platform placed on a tower or atop a tall building. The fundamental idea behind a cellular system is frequency reuse. This concept of frequency reuse is implemented by employing a pattern of overlapping cells, with each cell conceptually viewed as a hexagon. Frequency reuse allows the cellular system to employ a limited number of radio channels to serve many users. For example, a given geographic area may be served by N cells, divided into two clusters. Each cluster would contain N/2 cells. A separate set of channels would be assigned to each cell in a cluster. However, the sets used in one cluster would be reassigned in the other cluster, thus reusing the available spectrum. The signals radiated from a cell in channels assigned to that cell would be powerful enough to provide a usable signal to a mobile cellular telephone within that cell, but preferably not powerful enough to interfere with co-channel signals in distant cells. All cellular telephones within the system would preferably be capable of tuning to any of the channels.

The Federal Communications Commission (FCC) has allocated a 25 MHz spectrum for use by cellular systems. This spectrum is divided into two 12.5 MHz bands, one of which is available to wire line common carriers only and the other of which is available to non-wire line common carriers only. In any given system, the non-wire line service provider operates within the "A side" of the spectrum and the wire line provider operates within the "B side" of the spectrum. Cellular channels are 30 KHz wide and include control channels and voice channels. Each cell site (or, where a cell site is sectored, each sector of that cell site) uses only a single control channel. The control channel from a cell site to a mobile unit is called the "forward" control channel and the control channel from the cellular telephone to the cell site is called the "reverse" control channel. Signals are continuously broadcast over a forward control channel by each cell site.

When a cellular telephone is first turned on, it scans all forward control channels, listening for the channel with the strongest signal. The telephone then selects the forward control channel with the strongest signal and listens for system overhead messages that are broadcast periodically, for example, every 0.8 seconds. These overhead messages contain information regarding the access parameters to the cellular system. The overhead messages also contain busy/idle bits that provide information about the current availability of the reverse control channel for that cell. When the reverse control channel becomes free, as indicated by the busy/idle bits, the cellular telephone attempts to register itself with the system by seizing the reverse control channel.

Cellular telephones, while in an idle or standby mode, must constantly monitor a continuous stream of data messages sent by a cell site over a forward control channel. The format of these messages is depicted in FIG. 2 and is explained in more detail in the Electronic Industries Association (EIA) 553 Cellular System specification. The cellular telephone uses a dotting sequence, the first segment of the message, to synchronize the cellular telephone hardware to a clock of the data message. A synchronization word (sync) indicates that the data sequence is about to start. Due to the unreliable nature of a typical terrestrial propagation channel, messages from a cell site are repeated multiple times. Repeat streams A and B include forty-bit words (which are defined in EIA 553), each word being repeated five times in the message. Each data word is approximately 4.4 msec "long" and an entire message (or frame), including the dotting sequence, sync word, and streams A, B, is approximately 46.3 msec long. The cellular telephone receives both of the data streams A, B but processes only one of them. The least significant digit of the unit's telephone number determines which one the data streams is processed. If the telephone number is even, stream A is processed; otherwise stream B is processed. However, to receive and process these data streams, the telephone's receiver must be on and drawing power the entire time, thereby reducing the time the unit can be used.

U.S. Pat. No. 5,175,874, Dec. 29, 1992, titled Radiotelephone Message Processing for Low Power Operation, discloses a process for reducing power consumption in a cellular telephone. The disclosed process receives, digitizes (i.e., quantizes to binary form), and stores a first data word. An error code in the data word is then checked to determine whether errors exist in the word. If there are errors, the digital word is corrected. A second data word is then received, digitized, checked for errors, and, error corrected if necessary. The second digital word is then compared with the first. If the words are not the same, the receiver remains on until at least two words are identical or the entire five-word message is received, whichever occurs first. If two received words are equal, the message is processed and the receiver is turned off during the remaining portion of the message, until the next synchronization word is received.

Thus, in the process disclosed in the above-cited patent, a minimum of two message words must be received, converted to binary form, error corrected, and compared to one another to determine whether they are identical. This process is therefore limited to systems that encode the message data with an error correction code. In addition, it is believed that the disclosed process provides an unacceptably high average number of words received (note that a minimum of two words must be received) and unacceptably high probabilities of miss and false acceptance.

SUMMARY OF THE INVENTION

A primary goal of the present invention is to provide improved, in terms of performance and applicability to systems which do not employ error correction coding, methods and apparatus for reducing power consumption in a cellular telephone or like receiving device that receives multiple copies of a message. Pursuant to this goal, the present invention provides methods for reducing power consumption in a receiving device operating in an environment wherein multiple copies of a message block are transmitted for reception by the receiving device. The inventive methods comprise the steps of receiving a copy of a message block comprised of a plurality of data bits; generating unquantized (soft) output signals representative of all bits in the block; computing a block quality metric indicative of the reliability of the block; comparing the block quality metric with a first threshold; and, if the block quality metric bears a predetermined relation to the first threshold, combining the current block with a previously accepted block to obtain a combined block. Some embodiments of the invention will interrupt processing of further copies of the block if the block quality metric bears the predefined relation to the first threshold. However, presently preferred embodiments of the invention continue to the steps of determining whether the combined block includes any erasures (e.g., by employing a second threshold) and, if so, the number of erasures; comparing the number of erasures with a third threshold and continuing to the following step if the number of erasures is below the third threshold; decoding the combined block to determine whether it includes any errors and, if so, the number of errors; comparing the number of errors with a fourth threshold and, if the number of errors is below the fourth threshold, accepting the combined block and continuing to the following step; and generating timing signals instructing the receiving device to interrupt reception of further copies of the message block for a specified period of time.

In one preferred implementation of the present invention, the unquantized or soft outputs (i.e., the outputs before the decision variable is converted to a binary format) are generated by sampling the received block at sampling points, or decision points, so as to obtain representations of the individual bits forming the block. The block quality metric in preferred embodiments is an average value computed on the basis of the unquantized samples. For example, in one preferred embodiment (described below), the block quality metric comprises the variance of the signal power (VSP) around the decision points. Another embodiment employs the mean squared error (MSE) around decision points as a block quality metric.

Preferred embodiments further comprise the steps of rejecting the block and returning to the step of generating unquantized outputs if the block quality metric does not bear the predetermined relation to the first threshold. In addition, preferred embodiments further comprise the steps of rejecting the block and returning to the step of generating unquantized outputs if the number of erasures is not below the third threshold. Moreover, preferred embodiments further comprise the steps of rejecting the block and returning to the step of generating unquantized outputs if the number of errors (after decoding) is not below the fourth threshold.

In preferred embodiments of the invention, the number of copies of each message block is predetermined (e.g., five) and the inventive method includes the steps of, after the step of generating unquantized outputs, determining whether the copy received is the last copy and, if so, generating quantized (hard) decision points for the block, performing a majority vote with the last block and previously received blocks to construct a hard-combined block, and proceeding directly to the step of decoding the hard-combined block.

The present invention may advantageously be embodied in a cellular telephone for operation in an environment wherein multiple copies of a message block are transmitted. Such an embodiment preferably comprises a radio transceiver; a demodulator; a voice decoder; a voice encoder; a modulator; and control means for controlling the operation of the telephone so as to minimize its power consumption. The control means comprises means for controlling the telephone in adaptively determining the quality of the reception of each copy of a received word and in receiving only as many copies as needed to result in reliable operation.

The present invention exploits the fact that, due to the unreliable nature of a typical terrestrial propagation channel, messages from a central station (e.g., a cell site) to multiple receiving units (e.g., cellular telephones) are repeated multiple times. According to the invention, the receiving unit adaptively determines the quality of reception of each copy of a received word and receives only as many copies as needed to result in reliable unit operation. Under typical worst case channel conditions, reception of a single copy of each word is usually sufficient. Therefore, significant power savings result when the receiver and its associated circuitry are powered down during periods when reception of further copies of a word is unnecessary.

Other features of the invention are described below.

DETAILED DESCRIPTION OF PREFERRED EMBODIMENTS

Figure 1:
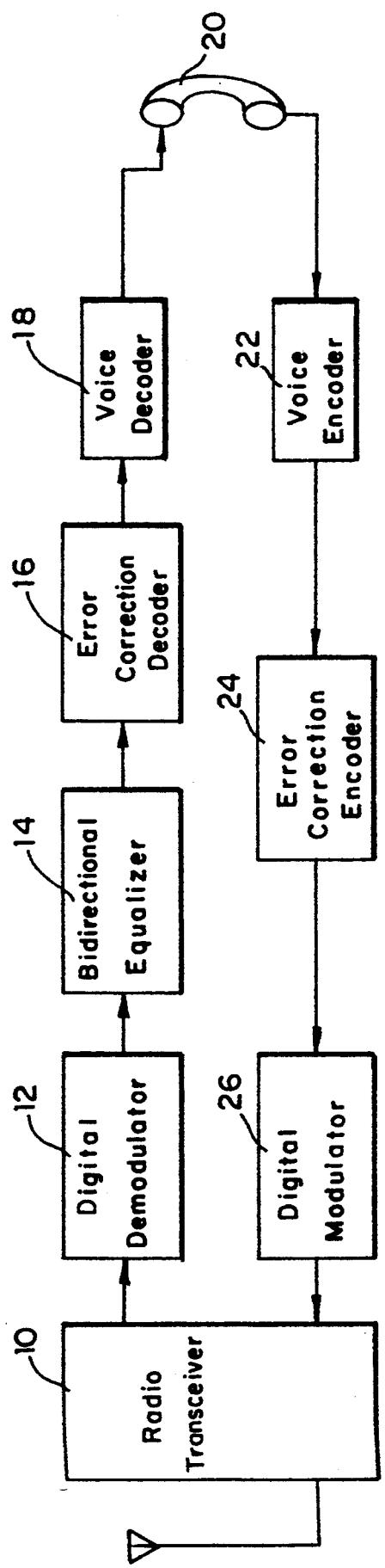
FIG. 1 is a block diagram of a cellular telephone.
Figure 2:
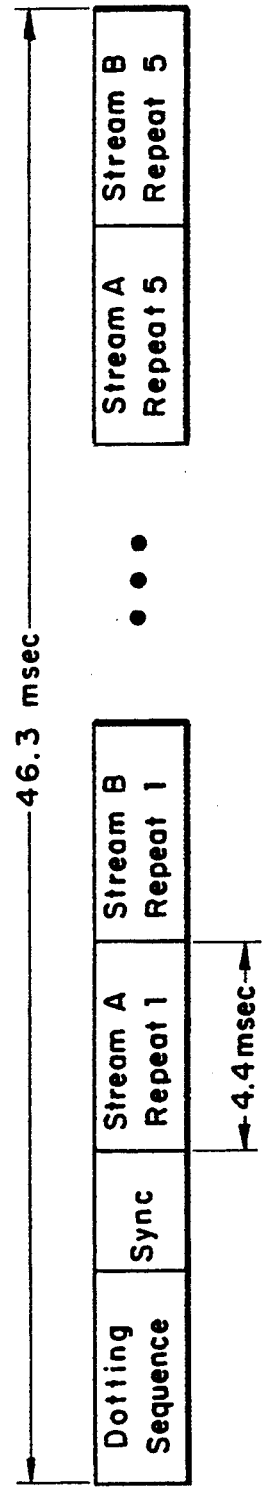
FIG. 2 illustrates the format of a data stream (one frame) received from a cell site.
Figure 3:
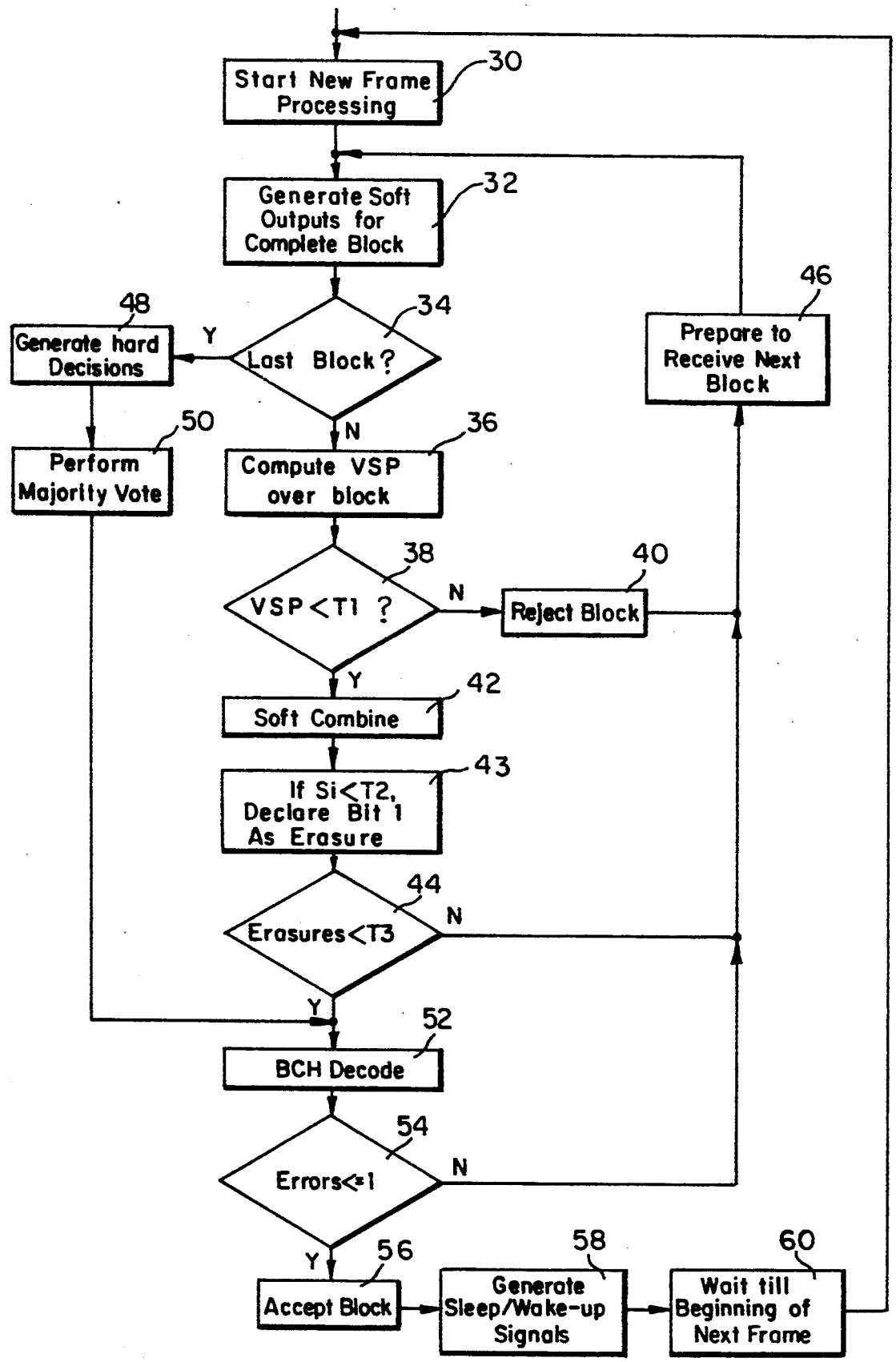
FIG. 3 is a flowchart of one preferred embodiment of the inventive method for reducing power consumption in a cellular telephone.

The present invention may best be described in connection with a method for operating a receiving device such as a cellular telephone of the kind discussed above with reference to FIG. 1. Accordingly, a preferred embodiment of the invention is depicted in FIG. 3 as a flowchart representative of software or firmware controlling a cellular telephone. The physical software is not in itself depicted in the drawings.

Referring to FIG. 3, the inventive method begins by initiating the processing of a new frame (step 30). This step involves receiving a first copy of a message block. The method then generates unquantized, soft output signals representative of all bits in the block (step 32). The soft outputs are generated by sampling the received block at decision points to obtain representations of the individual bits composing the block. For example, if the message frame contains 463 bits and the block contains forty bits, there preferably would be forty decision points at which a sample of the signal waveform would be obtained. The unquantized (soft) samples would be, in essence, numbers representative of the amplitude of the signal waveform at the respective sampling times (decision points). These numbers would typically be positive and negative voltage values ($\pm V$, where V is unquantized).

A determination is then made whether this block is the last block (step 34). If this is not the last block, the method computes a block quality metric indicative of the reliability of the block (step 36). The block quality metric in presently preferred embodiments comprises the variance of the signal power (VSP) around decision points of the block. The VSP may be computed by computing, as error values, the differences between respective sample values squared (which represent the power in the sample) and an average power.

For example, the following formula may be employed to compute the VSP:

$$VSP = \frac{1}{N} \sum_{i=0}^{N-1} (V_i - \overline{V})^2$$

$$\overline{V} = \frac{1}{N} \sum_{i=0}^{N-1} V_i$$

$$V_i = S_i^2$$

In the above formula, $S_i$ represents the received signal (sample) at the decision points; $V_i$ represents the received signal power at the decision points; S represents the value of the ideal decision point; and N represents the length of the block in bits (N=40 in the present example). The ideal decision point S represents an ideal voltage sample which would be received in the absence of noise (e.g., plus or minus some constant).

It should be noted that the present invention is by no means restricted to the use of the VSP as a block quality metric. For example, the mean squared error (MSE) could be used instead of the VSP.

The VSP is then compared with a first threshold T1 (step 38). For example, the first threshold in presently preferred embodiments is 3.88*$V^2$, where V represents the square of the ideal decision point S. If the VSP is less than the first threshold, the first block is combined with a previously "accepted" (see below) block to obtain a soft combined block (step 42). If the VSP is not less than the first threshold, the block is rejected (step 40) and the process branches to step 46, which is described below.

After the soft combine step, the method determines the number of erasures in the block (step 43), the number of erasures being another measure of the quality of the received block. The number of erasures is determined by comparing the signal samples $S_i$ with a second threshold T2 and declaring an erasure if $S_i$ is less than T2. The number of erasures is then compared with a third threshold T3 (step 44). In presently preferred embodiments, the third threshold is 2. If the number of erasures is less than the third threshold, the method decodes the soft-combined block (step 52), e.g., employing a BCH decoder (where "BCH" refers to the Bose-Chaudhuri, Hocquenghem error correction coding/decoding technique) and proceeds to step 54. If the number of erasures is not less than the third threshold, the method branches to step 46.

At step 54, the number of errors is determined and this number is compared with a fourth threshold (e.g., one). The decoded block is accepted (e.g., by storing it in a buffer) if the number of errors is less than or equal to the fourth threshold (step 56). The method then generates sleep/wake-up signals (step 58) and thereafter waits (step 60) until the next frame is received. The sleep/wake-up signals are timing signals instructing the receiving device to interrupt reception of further copies of the message block until the next frame begins.

At step 46, the method prepares for receiving the next block. This step essentially comprises setting up the receiver hardware (e.g., timers) to receive the next block.

As mentioned above, the number of copies of each message block is predetermined (e.g., five). The method determines (step 34) whether the copy received is the last copy and, if so, generates hard decision points for the block, i.e., quantizes the individual samples (step 48). The method then performs a majority vote with the last block and previously received blocks to construct a hard-combined block (step 50). The generation of a hard-combined block by majority vote is well known.

The present invention is by no means limited to the threshold values specified above in connection with the detailed description of one presently preferred embodiment. In general, threshold values are determined in the following manner. First, performance criteria are established for the specific application being considered. In the present case, the probability of missing a word and the probability of accepting a word falsely are the selected performance criteria. Ideally, both of these should be made as small as possible. Next, the sensitivity of these performance criteria with respect to each individual threshold is established. Thereafter, the first threshold is established on the basis of the performance criteria being close to where they should be. Then the next threshold is established to move the performance criteria closer to their target values. The process is then repeated with the next threshold, and so on, until the expected performance of the system meets the preestablished performance criteria. Finally, although two criteria were employed in the above example, it should be noted that one criterion may be sufficient in particular applications.

Finally, it should be noted that the scope of protection of the following claims is not limited to the particularities described above in connection with the presently preferred embodiments. For example, the invention may be practiced in association with a receiving device other than a cellular telephone.

We claim:

1. A method for reducing power consumption in a receiving device operating in an environment wherein multiple copies of message blocks are transmitted from a transmission device for reception by said receiving device, comprising the steps of:
(a) receiving a copy of a message block comprising a plurality of data bits;
(b) generating unquantized output signals representative of all data bits in said copy of said message block;
(c) computing, on the basis of said unquantized output signals, a block quality metric indicative of the reliability of said copy of said message block;
(d) comparing said block quality metric with a first threshold;
(e) if said block quality metric bears a predetermined relation to said first threshold indicating that reception of said copy of said message block is not unreliable, combining said copy of said message block with a message block previously accepted by said receiving device to obtain a combined message block;
(f) determining whether said combined message block is of a predetermined reception quality; and
(g) if said combined message block is of at least said predetermined reception quality, instructing said receiving device to interrupt reception of further copies of said message block for a specified period of time.

2. A method as recited in claim 1, wherein said reception quality determining step (f) comprises the steps of:
(h) determining whether said combined message block includes any erasures and, if so, the number of erasures, wherein the number of erasures is determined by comparing samples of said combined message block with a second threshold and declaring an erasure if a sample is less than said second threshold;
(i) comparing said number of erasures with a third threshold;
(j) if the number of erasures is below said third threshold, decoding the combined message block to determine whether it includes any errors and, if so, the number of errors; and
(k) comparing said number of errors with a fourth threshold and, if the number of errors is below said fourth threshold, accepting said copy of said message block.

3. A method as recited in claim 1, wherein said step of computing the block quality metric comprises the step of determining the variance of the signal power (VSP) around decision points of the message block.

4. A method as recited in claim 1, wherein said step of computing the block quality metric comprises the step of determining the mean squared error (MSE) around decision points of the message block.

5. A method as recited in claim 1, further comprising the steps of rejecting said message block and returning to step (a) if, at step (d), said block quality metric does not bear said predetermined relation to said first threshold.

6. A method as recited in claim 2, further comprising the steps of rejecting said message block and returning to step (a) if, at step (j), said number of erasures is not below said third threshold.

7. A method as recited in claim 2, further comprising the steps of rejecting said message block and returning to step (a) if, at step (k), said number of errors is not below said fourth threshold.

8. A method as recited in claim 2, wherein the number of copies of each message block is predetermined and further comprising the steps of, after step (b), determining whether said copy of the message block received at step (a) is the last copy of the message block and, if so, generating quantized decision points for said message block, performing a majority vote with said last copy of the message block and message blocks previously accepted by said receiving device to construct a hard-combined message block, and proceeding directly to decoding step (j) to decode said hard-combined message block.

9. A receiving apparatus for operation in an environment wherein multiple copies of message blocks are transmitted by a transmitting apparatus for reception by said receiving apparatus, comprising:
(a) means for receiving a copy of a message block comprising a plurality of data bits;
(b) means for generating unquantized output signals representative of all data bits in said copy of said message block;
(c) means for computing, on the basis of said unquantized output signals, a block quality metric indicative of the reliability of said copy of said message block;
(d) means for comparing said block quality metric with a first threshold;
(e) means for combining said copy of said message block with a message block previously accepted by said receiving means to obtain a combined message block if said block quality metric bears a predetermined relation to said first threshold indicating that reception of said copy of said copy of said message block is not unreliable;
(f) determining means for determining whether said combined message block is of a predetermined reception quality; and
(g) means for interrupting reception of further copies of said message block for a specified period of time if said combined message block is of at least said predetermined reception quality.

10. An apparatus as recited in claim 9, wherein said computing means computes the variance of the signal power (VSP) around decision points of the message block.

11. An apparatus as recited in claim 9, wherein said computing means computes the mean squared error (MSE) around decision points of the message block.

12. An apparatus as recited in claim 9, further comprising means for rejecting said message block if said block quality metric does not bear said predetermined relation to said first threshold.

13. An apparatus as recited in claim 9, wherein said determining means determines the number of erasures in said combined message block and rejects said message block if said number of erasures is not below a second threshold.

14. An apparatus as recited in claim 13, wherein said determining means determines the number of errors in said combined message block and rejects said message block if said number of errors is not below a third threshold.

15. An apparatus as recited in claim 9, wherein the number of copies of each message block is predetermined and further comprising means for determining whether the copy of the message block being processed is the last copy of the message block and, if so, generating quantized decision points for said message block, performing a majority vote with said last copy of the message block and message blocks previously accepted by said receiving means to construct a hard-combined message block.

16. A cellular telephone for operation in an environment wherein multiple copies of a message block are transmitted by a transmitting device, comprising a radio transceiver; a demodulator; a voice decoder; a voice encoder; a modulator; and control means for controlling the operation of the telephone so as to minimize its power consumption, said control means comprising (1) first reliability determining means for adaptively determining the reliability of the reception of each copy of a received message block, (2) means for combining said received message block with a message block previously accepted by said first reliability determining means to get a combined message block when a current copy of said received message block is determined by said first reliability determining means to have a suitable signal quality, (3) second reliability determining means for adaptively determining the reliability of the reception of said combined message block, and (4) means for ignoring subsequent copies of said received message block for a predetermined period of time if the reception of said combined message block is found to be reliable by said second reliability determining means.

17. A cellular telephone as recited in claim 16, wherein said first reliability determining means comprises:

means for receiving said current copy of said received message block, said current copy of said received message block comprising a plurality of data bits;

means for generating unquantized output signals representative of all data bits in said current copy of said received message block;

means for computing, on the basis of said unquantized output signals, a block quality metric indicative of the reliability of said current copy of said received message block; and means for comparing said block quality metric with a first threshold, and wherein said second reliability determining means comprises:

means for determining whether said combined message block includes any erasures and, if so, the number of erasures;

means for comparing said number of erasures with a second threshold;

means for decoding the combined message block to determine whether it includes any errors and, if so, the number of errors; and means for comparing said number of errors with a third threshold and, if the number of errors is below said third threshold, accepting said current copy of said received message block.

* * * * *

UNITED STATES PATENT AND TRADEMARK OFFICE
CERTIFICATE OF CORRECTION

PATENT NO. : 5,406,613
DATED : Apr. 11, 1995
INVENTOR(S) : George M. Peponides, et al It is certified that error appears in the above-indentified patent and that said Letters Patent is hereby corrected as shown below:

On title page, item [54] and col. 1, lines 1-6, should read as follows:

--METHOD AND APPARATUS FOR REDUCING POWER CONSUMPTION IN CELLULAR TELEPHONES BY ADAPTIVELY DETERMINING THE RELIABILITY OF THE RECEPTION OF A RECEIVED MESSAGE BLOCK--

Signed and Sealed this

Seventh Day of November, 1995

Attest:

BRUCE LEHMAN

*Attesting Officer*  *Commissioner of Patents and Trademarks*